United States Patent
Lam et al.

(10) Patent No.: US 8,984,980 B2
(45) Date of Patent: Mar. 24, 2015

(54) GEAR MOTOR ASSEMBLY

(71) Applicant: Johnson Electric S.A., Murten (CH)

(72) Inventors: Wing Cheung Lam, Hong Kong (CN); Qiang Xu, Shenzhen (CN); Marlou Tampus Malabo, Hong Kong (CN)

(73) Assignee: Johnson Electric S.A., Murten (CH)

( * ) Notice: Subject to any disclaimer, the term of this patent is extended or adjusted under 35 U.S.C. 154(b) by 76 days.

(21) Appl. No.: 13/732,040

(22) Filed: Dec. 31, 2012

(65) Prior Publication Data

US 2013/0167680 A1  Jul. 4, 2013

(30) Foreign Application Priority Data

Dec. 31, 2011  (CN) .......................... 2011 1 0459370

(51) Int. Cl.
| | |
|---|---|
| *F16H 1/16* | (2006.01) |
| *F16H 1/20* | (2006.01) |
| *F16C 33/10* | (2006.01) |
| *F16H 57/04* | (2010.01) |

(52) U.S. Cl.
CPC ......... *F16H 57/048* (2013.01); *Y10T 74/19991* (2013.01); *F16H 57/0498* (2013.01); *F16C 33/10* (2013.01); *F16H 57/0471* (2013.01)
USPC ........................................... 74/425; 384/291

(58) Field of Classification Search
CPC ......... F16H 1/16; F16H 57/039; F16H 1/166; F16H 55/17; F16H 55/22; F16H 2057/02034; F16H 57/0464; F16H 1/203; F16C 33/104; F16C 33/1065; F16C 33/10; F16C 33/102; F16C 33/1075; F16C 2240/40; F16C 2240/42
USPC ............. 74/421 A, 421 R, 425; 384/279, 291
See application file for complete search history.

(56) References Cited

U.S. PATENT DOCUMENTS

| | | | |
|---|---|---|---|
| 1,377,866 A * | 5/1921 | White ........................... 384/291 |
| 5,836,076 A * | 11/1998 | Duta et al. .................... 29/893.1 |
| 5,857,318 A * | 1/1999 | Odai et al. ........................... 59/4 |
| 6,338,575 B1 * | 1/2002 | Chen .............................. 384/279 |
| 2002/0011127 A1 * | 1/2002 | Torii et al. ....................... 74/425 |
| 2007/0177833 A1 * | 8/2007 | Egami et al. .................. 384/279 |

FOREIGN PATENT DOCUMENTS

| | | |
|---|---|---|
| CN | 1368606 A | 9/2002 |
| CN | 1782452 A | 6/2006 |

* cited by examiner

*Primary Examiner* — Justin Krause
(74) *Attorney, Agent, or Firm* — Muncy, Geissler, Olds & Lowe, P.C.

(57) ABSTRACT

A gear motor assembly includes a casing having a through hole, a motor fixed to the casing, an output shaft, a gear fixed to the output shaft and driven by the motor, and a substantially tubular bearing fixed in the through hole of the casing. The gear has a shaft portion that is sleeved in the bearing. A slot is formed in the inner surface of the bearing and/or the outer surface of the shaft portion and is filled with lubricant.

5 Claims, 3 Drawing Sheets

GEAR MOTOR ASSEMBLY

CROSS REFERENCE TO RELATED APPLICATIONS

This non-provisional patent application claims priority under 35 U.S.C. §119(a) from Patent Application No. 201110459370.8 filed in The People's Republic of China on Dec. 31, 2011.

FIELD OF THE INVENTION

The present invention relates to a gear motor assembly and in particular, to a gear motor assembly having a bearing surface with a groove for lubricant.

BACKGROUND OF THE INVENTION

A gear motor assembly for a sunroof usually includes a casing having a through hole, a motor fixed to the casing, a gear housed in the casing, and a bearing fixed in the hole. The gear has a shaft running through the hole and sleeved by the bearing. The shaft couples to the sunroof. During operation, the shaft rotates with respect to the bearing. In most gear motor assemblies, the inner wall of the bearing and the outer wall of the shaft are smooth arcuate surfaces. In order to reduce vibration or wobbling of the gear during rotation, the gap between the shaft and the bearing is designed as small as possible which leaves little room for receiving lubricant. Thus, less lubricant can be accommodated in the gap, resulting at times in hard contact between the shaft and the gear during rotation and, therefore, produces a loud noise.

Hence there is a desire for a new gear motor assembly producing less noise during operation.

SUMMARY OF THE INVENTION

Accordingly, in one aspect thereof, the present invention provides a gear motor assembly, comprising: a casing having a through hole; a motor fixed to the casing; an output shaft; a gear fixed to the output shaft and driven by the motor; a substantially tubular bearing fixed in the through hole of the casing and sleeving a shaft potion of the gear; and at least one slot containing lubricant formed in at least one of an inner surface of the bearing and an outer surface of the shaft portion of the gear.

Preferably, the axial length of the at least one slot is not less than the axial length of the bearing.

Preferably, the at least one slot extends in the axial direction of the output shaft.

Preferably, the at least one slot comprises an odd number of slots formed in the outer surface of the shaft portion.

Alternatively, or in addition, the at least one slot comprises an odd number of slots formed in the inner surface of the bearing.

Preferably, the number of slots in the outer surface of the output shaft is not equal to the number of slots in the inner surface of the bearing.

Preferably, the slots are evenly spaced in the circumferential direction of the bearing or output shaft.

In embodiments of the present invention, as the slot is especially formed to receive lubricant, compared to gear motor assemblies of the prior art, less room between the output shaft and the bearing is needed to retain the lubricant. Therefore, the gear motor assembly is able to reduce friction while maintaining low vibration of the gear during operation. From another aspect, due to the slot extending through the entire bearing, the whole inner surface of the bearing can contact the lubricant, which improves the lubricity.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
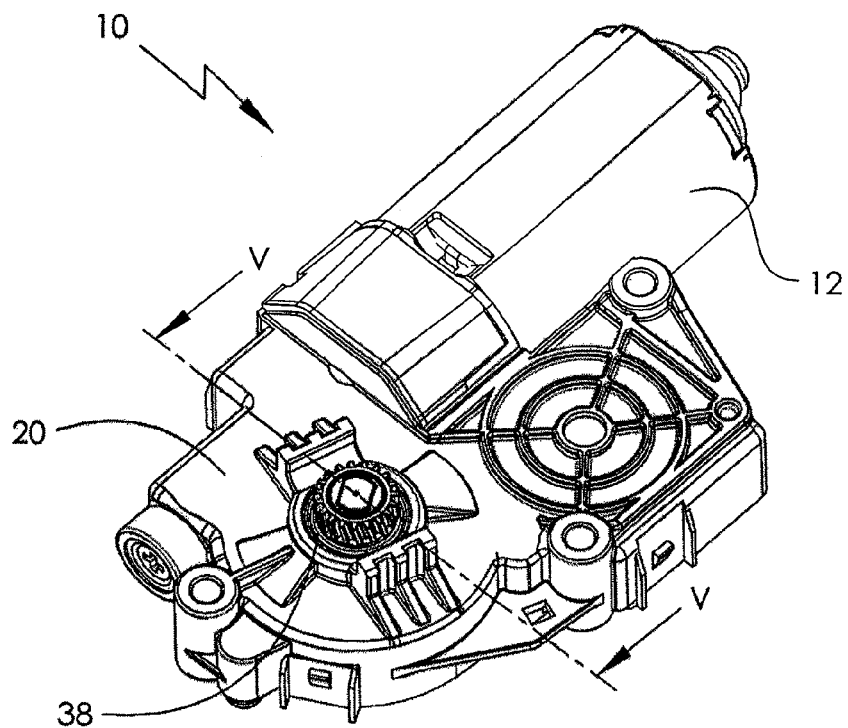
FIG. 1 shows a gear motor assembly in accordance with the preferred embodiment of the present invention.
Figure 2:
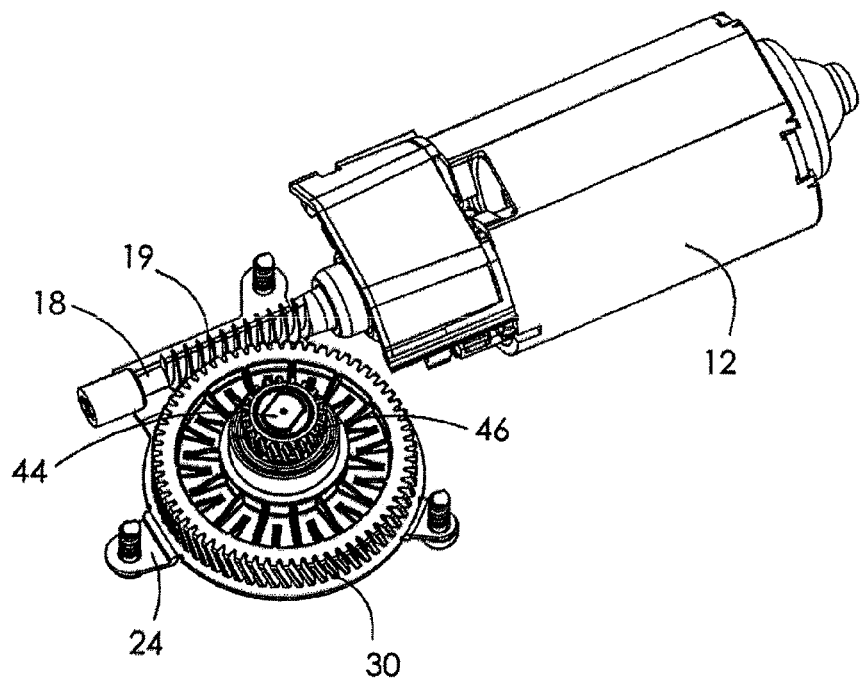
FIG. 2 shows the gear motor assembly of FIG. 1, with part of a casing removed.
Figure 3:
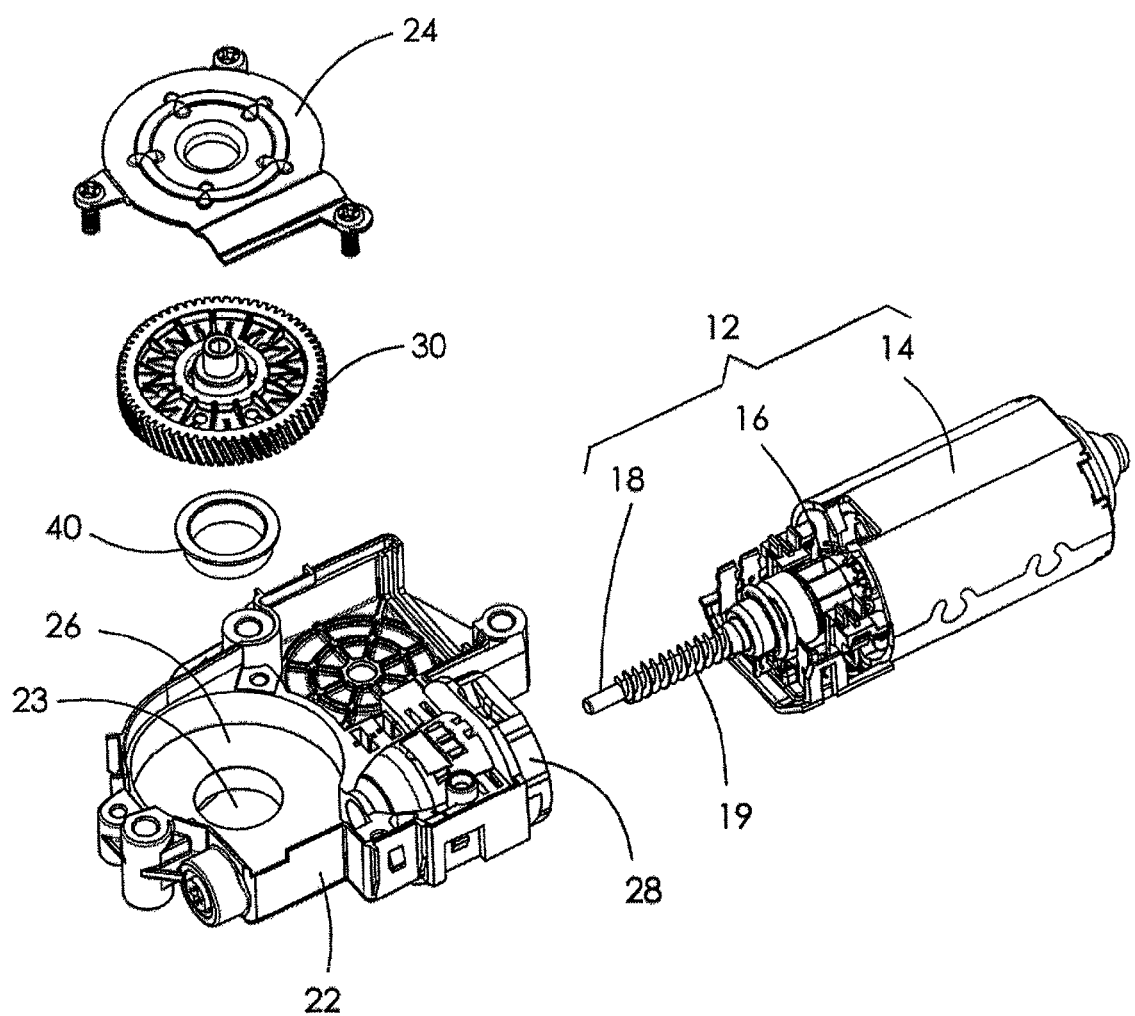
FIG. 3 is an partially exploded view of the gear motor assembly of FIG. 1.

The Figs. show a gear motor assembly 10, according to the preferred embodiment of the present invention, which may be used to drive a sunroof of a vehicle. The gear motor assembly 10 includes a casing 20, a motor 12 fixed to the casing 20, a gear 30 housed in the casing 20 and driven by the motor 12, and a substantially tubular bearing 40 fixed to the casing 20 and in which a shaft portion 34 of the gear 30 is sleeved.

The casing 20 includes a base 22 and a cover 24. The base 22 includes a compartment 26, a connection part 28 for connecting the motor 12, and a through hole 23 formed at the center of a bottom plate of the compartment 26. The cover 24 defines a shaft hole 25 at the center thereof. The shaft hole 25 is coaxial with the through hole 23. The cover 24 can be connected to the base 22 by screws.

The motor 12 includes a stator 14 and a rotor 16 received in the stator 14. The rotor 16 includes a motor shaft 18. A worm 19 is formed on the motor shaft. The motor 12 is connected to the casing 20 with the worm 19 of the motor shaft 18 received inside the compartment 26. The connection part 28 of the base 22, forms an end cap for the motor, closing one end of the stator 14.

Figure 4:
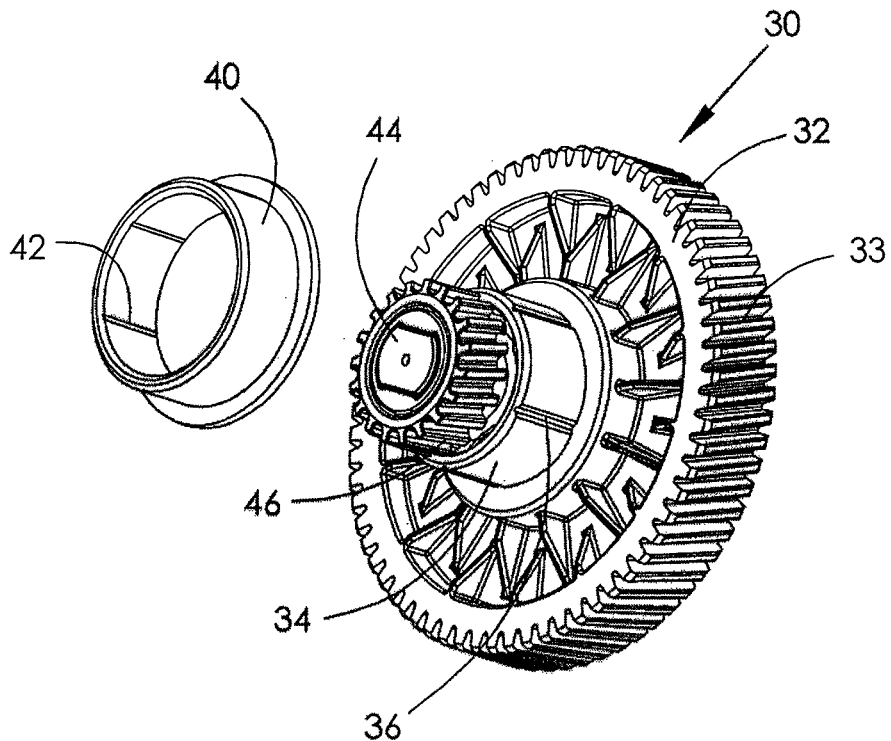
FIG. 4 shows a gear and a bearing of the gear motor assembly of FIG. 1.
Figure 5:
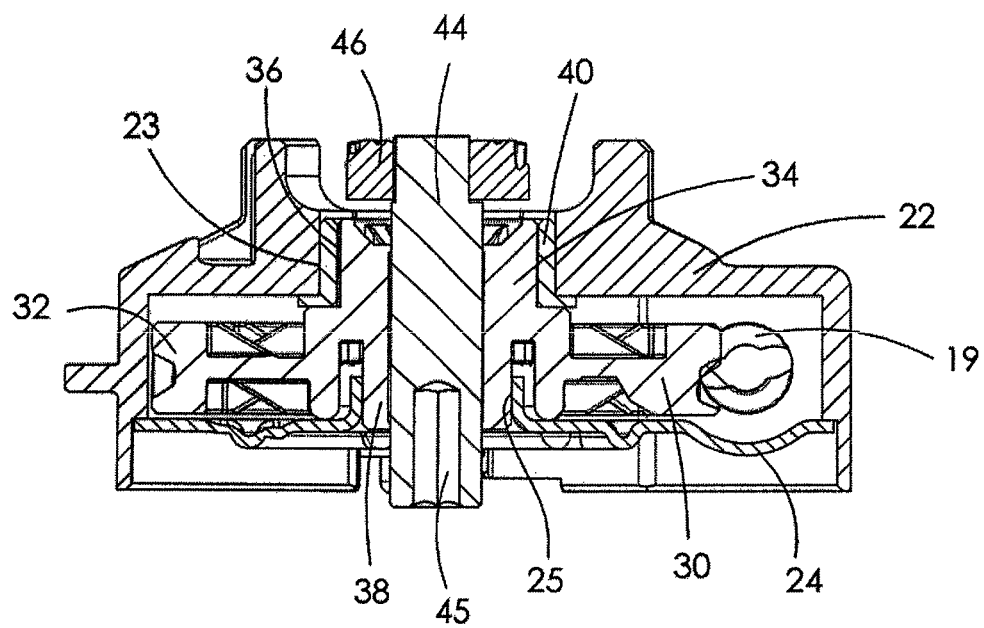
FIG. 5 is a sectional view of the gear motor assembly, sectioned along line V-V of FIG. 1.

The gear 30 is more clearly shown in FIGS. 4 and 5. The gear has a body portion 32 having gear teeth 33, preferably helical gear teeth, formed on a radially outer peripheral surface, arranged to engage the worm of the motor shaft. The gear also has the shaft portion 34. The shaft portion defines a bearing surface which is sleeved in the tubular bearing 40. The shaft portion has a number of axially extending slots 36. The gear is a molded plastic part which is fixed to an output shaft 44, preferably by insert molding or by being pressed over knurls formed on the shaft. Preferably, the output shaft is of metal. An output cog is fixed to the end of the output shaft adjacent the shaft portion 34. The other end of the output shaft 44 has a hexagonal blind hole 45. In case of an emergency, such as a vehicle power failure, an Allen key may be inserted into the hexagonal hole to manually operate the gear motor assembly to open or close the sun roof. Preferably, the axial length of the slots 36 is not less than the axial length of the bearing 40. The slots 36 preferably extend in the axial direction of the shaft portion 34 and are evenly arranged in the circumferential direction of the shaft portion 34. The bearing 40 can be an oil-impregnated sleeve bearing.

During assembly, the bearing 40 is fixed in the through hole 23. The slots 36 are filled with lubricant such as oil or preferably grease. The body 32 of the gear 30 is received in the compartment 26 and engages with the worm 19 of the motor shaft 18. The output cog 46 is passed through the bearing 40 to couple with the sun roof. The shaft potion is located or sleeved within the bearing 40 and the slots 36. The slots 36 and the lubricant received therein are then surrounded by the bearing 400. The cover 24 is assembled to the base 22, with a boss 38 of the gear 30 received in the shaft hole 25. As such, the gear 30 can rotate about an axis of the output shaft 44.

As diametrically opposite side surfaces of the shaft portion 34 are the positions most likely to deform when the shaft portion 34 is bent, therefore, the number of slots 36 is preferably odd so as not to reduce the diameter of the shaft portion 34 too much where the slot 36 is formed. In the present embodiment, the shaft portion 34 has 5 slots.

Referring to FIG. 4, in the present embodiment, the slots 36 are formed in the shaft portion 34 of the gear 30. It should be understood that, in other embodiments, slots 42 can also be formed in the inner surface of the bearing 40 rather than the outer surface of the shaft portion 34. Optionally, the outer surface of the shaft portion 34 and the inner surface of the bearing 40 are both formed with slots 36 and 42 to fulfill the same lubrication effect. In this arrangement, the number of slots 36 is preferably not equal to the number of slots 42, co that the $^{shaft}$ portion 34 together with $^{the}$ bearing 40 will not be easily bent for the reason described above.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A gear motor assembly, comprising:
a casing having a through hole;
a motor fixed to the casing;
an output shaft;
a gear fixed to the output shaft and driven by the motor;
a substantially tubular bearing fixed in the through hole of the casing and sleeving a shaft portion of the gear; and
at least one slot containing lubricant formed in at least one of an inner surface of the bearing and an outer surface of the shaft portion; wherein
the at least one slot comprises an odd number of slots formed in the outer surface of the shaft portion;
the at least one slot further comprises an odd number of slots formed in the inner surface of the bearing; and
the number of slots in the outer surface of the shaft portion is not equal to the number of slots in the inner surface of the bearing.

2. The gear motor assembly of claim 1, wherein the axial length of the at least one slot is not less than the axial length of the bearing.

3. The gear motor assembly of claim 1, wherein the at least one slot extends in the axial direction of the output shaft.

4. The gear motor assembly of claim 1, wherein the slots are evenly spaced in the circumferential direction of the bearing.

5. The gear motor assembly of claim 1, wherein the slots are evenly spaced in the circumferential direction of the output shaft.

* * * * *